United States Patent
Bogner

(10) Patent No.: US 11,095,507 B2
(45) Date of Patent: Aug. 17, 2021

(54) GLOBALLY-DISTRIBUTED SECURE END-TO-END IDENTITY-BASED OVERLAY NETWORK

(71) Applicant: Proofpoint, Inc., Sunnyvale, CA (US)

(72) Inventor: Etay Bogner, Tel Aviv (IL)

(73) Assignee: Proofpoint, Inc., Sunnyvale, CA (US)

( * ) Notice: Subject to any disclaimer, the term of this patent is extended or adjusted under 35 U.S.C. 154(b) by 291 days.

(21) Appl. No.: 15/647,309

(22) Filed: Jul. 12, 2017

(65) Prior Publication Data

US 2018/0331903 A1 Nov. 15, 2018

Related U.S. Application Data

(60) Provisional application No. 62/503,346, filed on May 9, 2017.

(51) Int. Cl.
| | |
|---|---|
| *G06F 15/16* | (2006.01) |
| *H04L 12/24* | (2006.01) |
| *H04L 29/08* | (2006.01) |
| *H04L 12/46* | (2006.01) |
| *H04L 12/54* | (2013.01) |
| *H04L 12/26* | (2006.01) |
| *H04L 12/741* | (2013.01) |
| *H04L 12/801* | (2013.01) |
| *H04L 12/851* | (2013.01) |

(52) U.S. Cl.
CPC ...... *H04L 41/0816* (2013.01); *H04L 12/4645* (2013.01); *H04L 12/56* (2013.01); *H04L 43/08* (2013.01); *H04L 45/74* (2013.01); *H04L 47/10* (2013.01); *H04L 47/24* (2013.01); *H04L 67/141* (2013.01); *H04L 69/325* (2013.01)

(58) Field of Classification Search
CPC ............ H04L 12/4645; H04L 41/0816; H04L 12/56; H04L 43/08; H04L 45/74; H04L 47/10; H04L 47/24; H04L 67/141; H04L 69/325; H04L 43/0858; H04J 3/0667
USPC ........................................................ 709/223
See application file for complete search history.

(56) References Cited

U.S. PATENT DOCUMENTS 7,328,237 B1 2/2008 Thubert et al.
10,462,045 B1 * 10/2019 Francois ................ H04L 41/12
(Continued)

FOREIGN PATENT DOCUMENTS

WO 2008006041 A2 1/2008

OTHER PUBLICATIONS

Stefano Previdi, "Segment Routing for IPV6 networks (SRv6)", 2016.*
(Continued)

*Primary Examiner* — Oscar A Louie
(74) *Attorney, Agent, or Firm* — Banner & Witcoff, Ltd.

(57) ABSTRACT

A communication system includes multiple Point-of-Presence (POP) interfaces and one or more processors. The multiple POP interfaces are distributed in a Wide-Area Network (WAN) and are configured to communicate with at least a client and a server connected to the WAN. The one or more processors are coupled to the POP interfaces and are configured to (i) assign respective Internet Protocol (IP) addresses to the client and to the server, including embedding state information in the assigned IP addresses, and (ii) route traffic over the WAN between the client and the server, in a stateless manner, based on the state information embedded in the IP addresses.

21 Claims, 2 Drawing Sheets

(56) References Cited

U.S. PATENT DOCUMENTS

| | | | |
|---|---|---|---|
| 2004/0019781 A1* | 1/2004 | Chari | H04L 63/1408 713/153 |
| 2004/0205247 A1 | 10/2004 | Ahn | |
| 2006/0236370 A1 | 10/2006 | John et al. | |
| 2008/0008179 A1* | 1/2008 | Chen | H04L 61/2007 370/392 |
| 2008/0320303 A1 | 12/2008 | Khalid et al. | |
| 2009/0122798 A1 | 5/2009 | Iwai | |
| 2010/0002700 A1* | 1/2010 | Simpson, Jr. | H04L 29/12783 370/392 |
| 2011/0107004 A1 | 5/2011 | Maitra | |
| 2011/0110378 A1 | 5/2011 | Savolainen et al. | |
| 2012/0179796 A1 | 7/2012 | Nagaraj et al. | |
| 2013/0254365 A1* | 9/2013 | Gupta | H04L 45/22 709/223 |
| 2015/0256456 A1* | 9/2015 | Previdi | H04L 69/22 370/392 |
| 2016/0028625 A1* | 1/2016 | Hari | H04L 45/74 370/392 |
| 2017/0171232 A1* | 6/2017 | Graham-Cumming | H04L 9/3263 |

OTHER PUBLICATIONS

P. Viriyaphol and C. Jittawiriyanukoon, "Efficient routing with clue protocol for IP based networks," 2005 2nd Asia Pacific Conference on Mobile Technology, Applications and Systems, Guangzhou, China, 2005, pp. 8 pp. 8 (Year: 2005).*

Ashok Kumar, A. R., Rao, S. V., & Goswami, D. (2016). Simple, efficient location-based routing for data center network using IP address hierarchy. International Journal of Network Management, 26(6), 492-514 (Year: 2016).*

M. Xu, S. Yang, D. Wang and J. Wu, "Two dimensional-IP routing," 2013 International Conference on Computing, Networking and Communications (ICNC), San Diego, CA, USA, 2013, pp. 835-839 (Year: 2013).*

C. Maihofer, "A survey of geocast routing protocols," in IEEE Communications Surveys & Tutorials, vol. 6, No. 2, pp. 32-42, Second Quarter 2004 (Year: 2004).*

Herbert., "Identifier-locator addressing for network virtualization draft-herbert-nvo3-ila-00", Intended Status: Experimental Google, Internet-Draft, 31 pages, Jan. 20, 2015.

Carpenter., "Architectural Principles of the Internet", Request for Comments: 1958, 8 pages, Jun. 1996.

Deering et al., "Internet Protocol, Version 6 (IPv6)", Request for Comments: 2460, 39 pages, Dec. 1998.

Meyer et al., "Report from the IAB Workshop on Routing and Addressing", Request for Comments: 4984, 39 pages, Sep. 2007.

Atkinson et al., "Identifier-Locator Network Protocol (ILNP) Architectural Description", Request for Comments: 6740, 53 pages, Nov. 2012.

European Application # 18170415.6 search report dated Oct. 22, 2018.

European Application # 18169986.9 search report dated Oct. 16, 2018.

U.S. Appl. No. 15/968,762 office action dated May 20, 2019.

Bogner et al., U.S. Appl. No. 15/647,309, filed Jul. 12 , 2017.

Nov. 19, 2019 U.S. Final Office Action—U.S. Appl. No. 15/968,763.

Jun. 5, 2020 U.S. Non-Final Office Action—U.S. Appl. No. 15/968,762.

* cited by examiner

GLOBALLY-DISTRIBUTED SECURE END-TO-END IDENTITY-BASED OVERLAY NETWORK

CROSS-REFERENCE TO RELATED APPLICATIONS

This application claims the benefit of U.S. Provisional Patent Application 62/503,346, filed May 9, 2017, whose disclosure is incorporated herein by reference.

FIELD OF THE INVENTION

The present invention relates generally to network communication, and particularly to overlay networks.

BACKGROUND OF THE INVENTION

Various applications and use-cases call for secure communication over public and/or wide-area networks, such as over the Internet. One example use-case is communication among employees of a globally-distributed enterprise. Some existing solutions employ Virtual Private Networks (VPNs), or application-level protocols such as Hypertext Transfer Protocol-Secure (HTTPS).

SUMMARY OF THE INVENTION

An embodiment of the present invention that is described herein provides a communication system including multiple Point-of-Presence (POP) interfaces and one or more processors. The multiple POP interfaces are distributed in a Wide-Area Network (WAN) and are configured to communicate with at least a client and a server connected to the WAN. The one or more processors are coupled to the POP interfaces and are configured to (i) assign respective Internet Protocol (IP) addresses to the client and to the server, including embedding state information in the assigned IP addresses, and (ii) route traffic over the WAN between the client and the server, in a stateless manner, based on the state information embedded in the IP addresses.

In some embodiments, the processors are configured to embed, as part of the state information, a routing path for routing the traffic between the client and the server. In an embodiment, the processors are configured to route the traffic based only on the embedded routing path. In some embodiments, the processors are configured to embed, as part of the state information, a definition of a policy related to the server or to the client. In an embodiment, the processors are configured to enforce the policy, in a stateless manner, based on the embedded definition.

In another embodiment, the processors are configured to embed at least part of the state information upon initially provisioning the client. In yet another embodiment, the processors are configured to embed at least part of the state information in response to receiving a request from the client to communicate with the server. In an example embodiment, the processors are configured to receive the request in a Domain Name System (DNS) request, and to respond to the DNS request by (i) assigning to the server an IP address having the at least part of the state information embedded therein, and (ii) sending to the client a DNS response including the IP address.

In yet another embodiment, the processors are configured to embed a unique identifier of the client in an IP address assigned to the client. In some embodiments, the assigned IP addresses include IP version 6 (IPv6) addresses.

There is additionally provided, in accordance with an embodiment of the present invention, a communication method including assigning respective Internet Protocol (IP) addresses to a client and to a server that are connected to a Wide-Area Network (WAN), including embedding state information in the assigned IP addresses. Traffic is routed over the WAN between the client and the server in a stateless manner, using multiple Point-of-Presence (POP) interfaces distributed in the WAN, based on the state information embedded in the IP addresses.

There is further provided, in accordance with an embodiment of the present invention, a computer software product, the product including a tangible non-transitory computer-readable medium in which program instructions are stored, which instructions, when read by one or more processors that are coupled to multiple Point-of-Presence (POP) interfaces that are distributed in a Wide-Area Network (WAN), cause the processors to (i) assign respective Internet Protocol (IP) addresses to a client and to a server connected to the WAN, including embedding state information in the assigned IP addresses, and (ii) route traffic over the WAN between the client and the server, in a stateless manner, based on the state information embedded in the IP addresses.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for implementing an overlay network over a Wide-Area Network (WAN), e.g., over the Internet. Such an overlay network can be used, for example, for connecting globally-distributed employees of an organization.

In some disclosed embodiments, an overlay network is implemented using multiple Point-of-Presence (POP) interfaces distributed across the WAN, and one or more processors. Among other tasks, the processors assign client Internet Protocol (IP) addresses to the clients of the overlay networks, and service IP addresses to servers that provide services to the clients.

As will be described in detail below, the processors typically embed in the assigned IP addresses state information, which enables stateless processing of the traffic exchanged between the clients and the servers. The embedded state information enables, for example, stateless routing of the traffic, and/or stateless enforcement of policies. Typically, the processors also embed in the client IP addresses unique client identities, which are later used in processing of client traffic, e.g., in enforcing policies. The processors typically assign IPv6 addresses, which comprise a sufficient number of spare bits for embedding the additional state information and identities.

Since the disclosed techniques enable stateless routing and stateless enforcing of policies, the various network elements are not required to make complex switching decisions and/or hold large data structures. Moreover, the disclosed techniques do not require installation of any dedicated drivers or other software on the clients and servers, and typically use existing IP security (IPSec) clients. As such, the disclosed solution is highly efficient, scalable and easy to deploy.

Moreover, in the disclosed embodiments the processors are typically not involved in the on-going data-plane operations of the overlay network, but rather in control-plane management. As such, the processors are not required to meet strict latency or processing-power requirements, and in particular do not necessarily have to be collocated with the POP interfaces. This capability, too, makes the disclosed overlay networks highly flexible, scalable and cost-effective.

In addition, since users typically connect to the nearest POP interface, rather than to a geographically remote gateway, user experience in enhanced as well.

System Description

Figure 1:
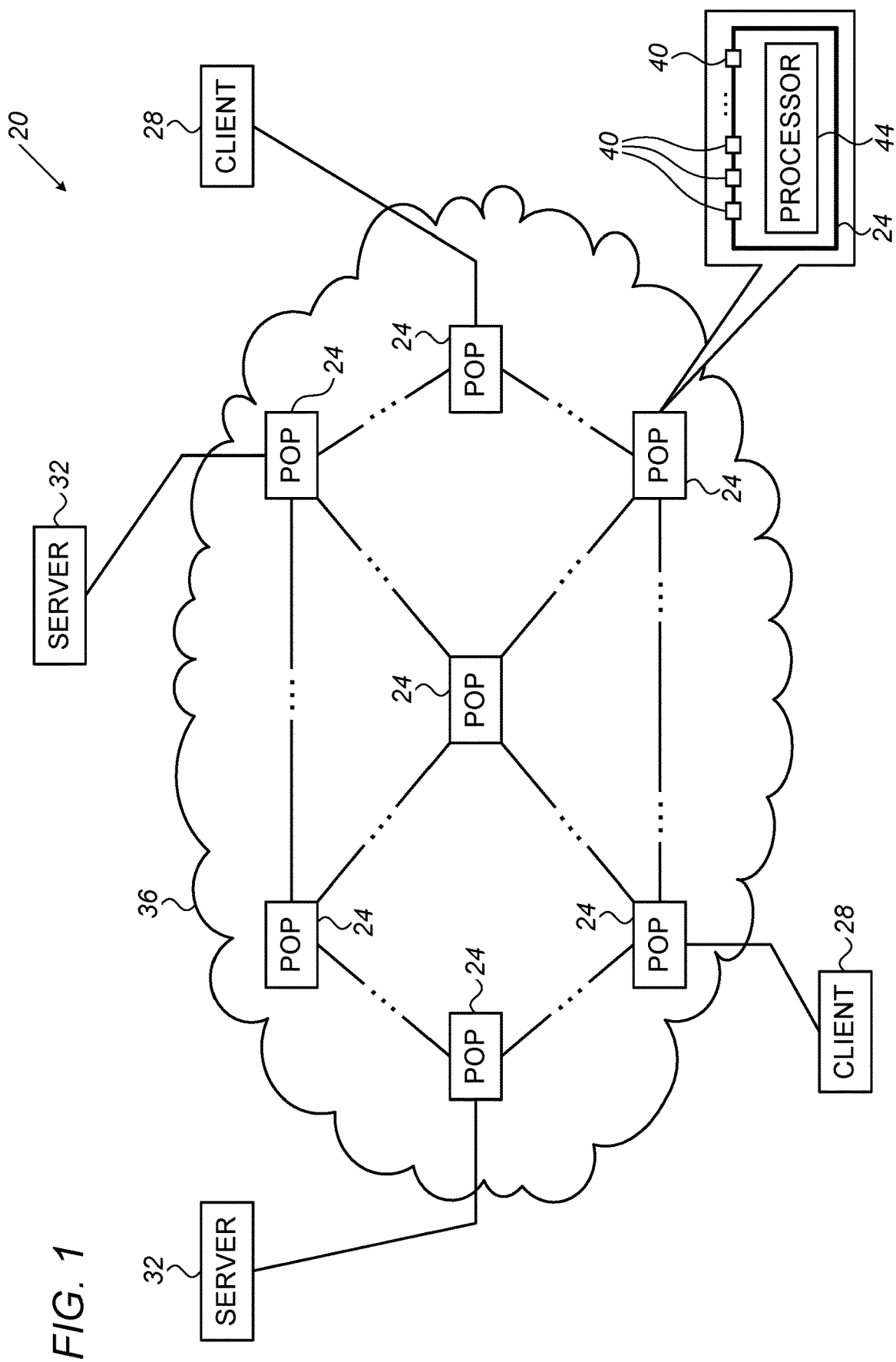
FIG. 1 is a block diagram that schematically illustrates an Internet-wide secure overlay network, in accordance with an embodiment of the present invention.

FIG. 1 is a block diagram that schematically illustrates an Internet-wide secure overlay system 20 (also referred to as overlay network), in accordance with an embodiment of the present invention. System 20 enables multiple clients 28 to consume services provided by one or more servers 32, across a Wide-Area Network (WAN) 36.

In one example embodiment, WAN 36 comprises the Internet, and clients 28 are used by employees of an organization who distributed worldwide. Multi-tenant systems, in which clients 28 belong to multiple different organizations, can also be implemented in a similar manner. Other use cases may comprise enabling non-employees (e.g., contractors) to access internal organization resources in a controlled manner, and/or connecting branch offices of an organization. More generally, system 20 enables users to gain access and services from multiple locations simultaneously, without a need to switch between Virtual Private Network (VPN) profiles or connect to different VPN gateways. Generally, systems such as system 20 can be used over any suitable WAN for any other suitable purpose.

Clients 28 may comprise any suitable wireless or wireline devices, such as, for example, laptop or tablet computers, desktop personal computers, cellular phones or smartphones, or any other suitable type of user devices that are capable of communicating over a network. Clients 28 may connect to WAN 36 in any suitable way, e.g., via a wireless and/or wireline access network.

Servers 32 may comprise any suitable computing platforms that are configured to provide services to clients 28. Several non-limiting examples of types of servers 32 comprise Web portals, Customer Relationship Management (CRM) systems, development systems, private cloud systems that host Virtual Machines (VMs), and file servers, to name just a few examples.

System 20 comprises multiple Point-of-Presence (POP) nodes 24 distributed over WAN 36. POP nodes 24 collectively implement a secure overlay network using methods that are described in detail below. In the present example, each POP node 24 comprises multiple ports 40 and a processor 44. Ports 40 are also referred to as "POP interfaces." Each port 40 typically comprises suitable physical circuitry for interfacing with a network link of WAN 36 or with a client 28, one or more memory buffers for buffering incoming and/or outgoing packets, and/or other suitable circuitry.

The configurations of system 20 and its various elements, e.g., POP nodes 24, shown in FIG. 1, are example configurations that are chosen purely for the sake of conceptual clarity. In alternative embodiments, any other suitable configurations can be used. For example, in the example embodiment of FIG. 1 each POP node 24 comprises a single processor 44 that is collocated with POP interfaces 40 of that POP node. Alternatively, however, some or even all of processors 44 need not necessarily be collocated with any of POP interfaces 40. Thus, a given POP node 24 may comprise any suitable number of processors 44, and some processors 44 may be located away from POP nodes 24. The description that follows refers to a certain "division of labor" among the various processors 44. This partitioning of tasks, however, is depicted purely by way of example. Alternatively, any other task partitioning can be used.

In various embodiments, POP nodes 24 may be implemented using suitable software, using suitable hardware, e.g., using one or more Application-Specific Integrated Circuits (ASICs) or Field-Programmable Gate Arrays (FPGAs), or using a combination of hardware and software elements. In some embodiments, processors 44 comprise one or more programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Communication Using Internet-Wide Secure Overlay Network

In some embodiments, processors 44 of POP nodes 24 jointly implement an overlay network for clients 28. In some embodiments, processors 44 assign IPv6 addresses to clients 28 and to servers 32. Typically, a client IP address is assigned when the client initially set-up in system 20. A server IP address (also referred to as a service IP address) is typically assigned when a client requests to access the respective server (to use the respective service). In some embodiments, state information such as policies and routing instructions are embedded in the client and service IP addresses. Network elements in WAN thus do not need to retain any state information regarding connections, clients and servers. Rather, network elements are able to route traffic and apply policies in a fully stateless manner, based only on the information embedded in the packets they process.

Figure 2:
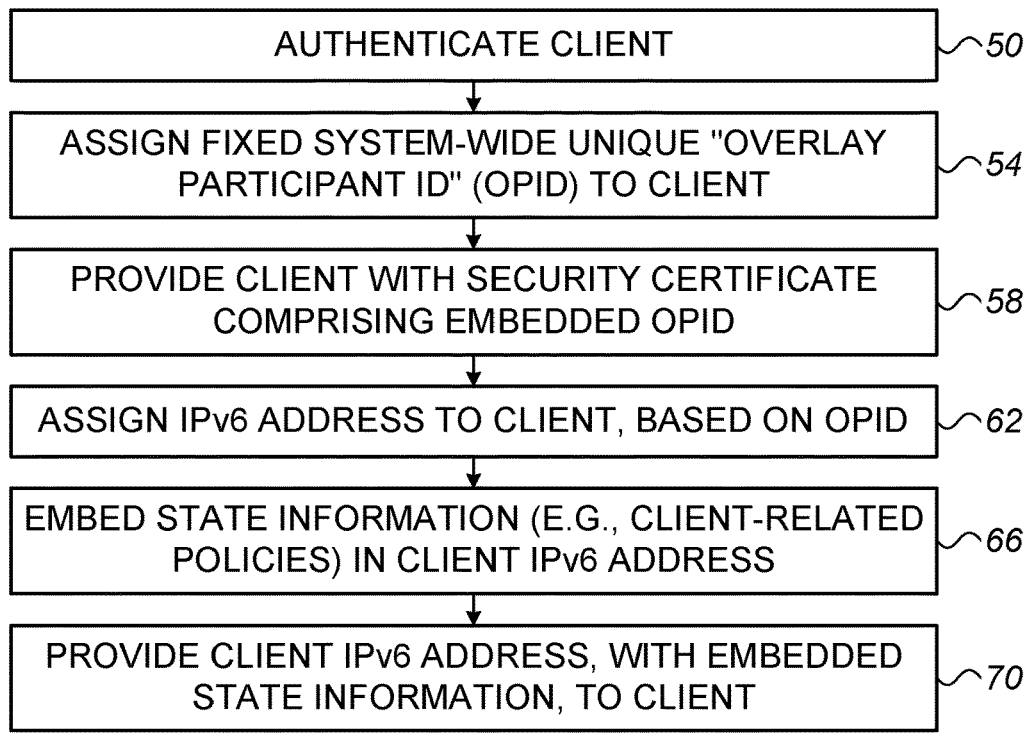
FIG. 2 is a flow chart that schematically illustrates a method for initial client set-up in the overlay network of FIG. 1, in accordance with an embodiment of the present invention.
Figure 3:
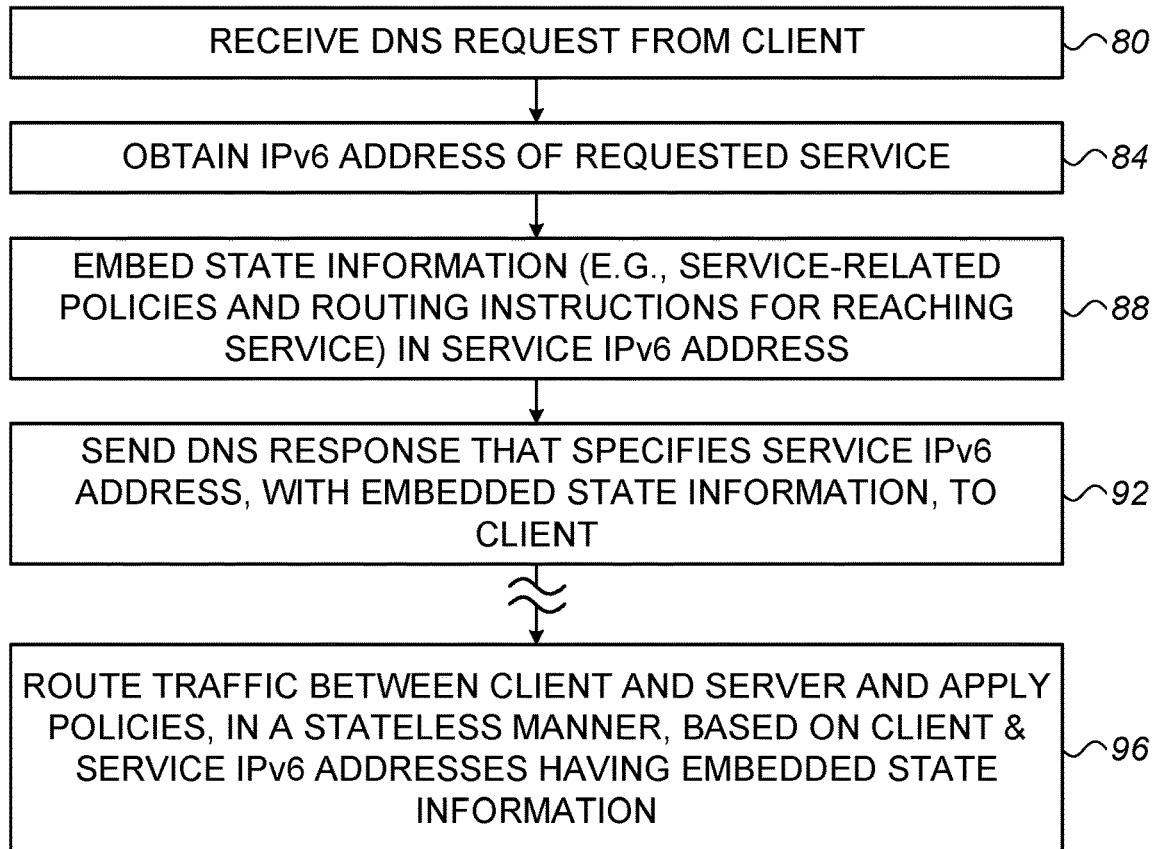
FIG. 3 is a flow chart that schematically illustrates a method for communication in the overlay network of FIG. 1, in accordance with an embodiment of the present invention.

The two flow charts below illustrate example flows of the disclosed techniques. FIG. 2 describes the flow in the "underlay" network, typically the public Internet. FIG. 3 describes the flow in the "overlay" network implemented over this underlay network.

FIG. 2 is a flow chart that schematically illustrates a method for initial set-up of a new client 28 in system 20, in accordance with an embodiment of the present invention. The method begins with processors 44 of system 20 authenticating the client, at an authentication step 50. Authentication can be performed by processor 44 of the POP node 24 that is nearest to the client (or alternatively by any other processor 44).

As part of a process of provisioning the client, processor 44 assigns the new client 28 a security certificate. The specific security features and details of certificate assignment are considered outside the scope of the present disclosure.

In some embodiments, processor 44 embeds in the security certificate a unique "Overlay Participant Identity" (OPID), at an identity assignment step 54. The OPID is a fixed identifier that is unique across the entire system 20. At a certificate & ID provisioning step 58, processor 44 sends the certificate, with the OPID embedded therein, to the client 28.

At a client IP assignment step 62, processor 44 assigns an IPv6 IP address to the client 28 in question. Processor 44 selects the client IP address based on the OPID of the client, which is embedded in the client's security certificate. (In an embodiment, during authentication the client shares the security certificate with a VPN gateway running on processor 44. Processor 44 extracts the OPID from the certificate and issues the client IP address based on the OPID.)

In addition, processor 44 embeds state information in the client IP address, at a state embedding step 66. In accordance with IPv6, the client IP address is a 128-bit address having multiple spare bits. Processor 44 typically embeds the state information in some of these spare bits.

In various embodiments, processor 44 may embed various types of state information in the client IP address. For example, the state information may comprise a definition of one or more policies applicable to the client 28. One example type of policy is a security policy, e.g., a policy that specifies access privileges of the client 28. Another example type of policy is a Quality-of-Service (QoS) policy, e.g., a policy that specifies a priority level, a guaranteed bandwidth, or any other suitable QoS parameters applicable to the client 28.

Additionally or alternatively, processor 44 may embed any other suitable policy definition, e.g., routing policies, and/or any other suitable type of state information, in the IP address it assigns to client 28. At a client IP provisioning step 70, processor 44 provides the assigned IP address to the client.

Typically, client 28 will use its client IP address (which was assigned as described above) as the source IP address in any subsequent packet it will send. Any POP node 24 receiving such a packet will be able to extract (i) the client OPID and (ii) the associated client-related policies from the IP address of the packet. Therefore, any POP node 24 is able to apply the correct policies to such packets in a fully stateless manner, without a need for complex data structures, rule engines and the like.

FIG. 3 is a flow chart that schematically illustrates a method for communication in overlay system 20, in accordance with an embodiment of the present invention. The process typically begins with the client connecting to the VPN gateway using the IPSec VPN, including authenticating using the certificate. This initial stage corresponds to the "underlay" network. The figure illustrates the subsequent process implemented as part of the "overlay" network, from the moment client 28 requests to access a Domain Name (e.g., Uniform Resource Locator—URL) of a requested service, until client 28 and the appropriate server 32 communicate via the overlay network.

The method begins with processors 44 receiving a Domain Name System (DNS) request from client 28, at a DNS request reception step 80. The DNS request is typically received and handled by processor 44 of the POP node 24 that is nearest to client 28. Typically, when system 20 serves multiple tenants (e.g., groups of clients belonging to different organizations), each tenant (e.g., organization) has a separate DNS system, and DNS requests are handled separately per tenant.

In the DNS request, client 28 typically specifies the Domain Name of the service it requests to consume. At a DNS resolution step 84, processor 44 resolves the Domain Name specified in the DNS request, i.e., translates the Domain Name into an IPv6-compliant IP address of a server 32 that provides the requested service. This IP address is referred to herein as a service IP address. The translation may be performed, for example, by querying a DNS server external to system 20, or in any other suitable way.

At a state information embedding step 88, processor 44 embeds state information in the service IP address. Any suitable state information can be embedded at this stage. For example, the state information may comprise a definition of one or more policies applicable to the service in question. The policies may comprise, for example, a security policy, a QoS policy and/or any other suitable policy applicable to the service requested in the DNS request.

Additionally or alternatively, the state information embedded in the service IP address may comprise routing information, which specifies how to route packets from the requesting client 28 to the server 32 that provides the requested service.

The embedded routing information may comprise, for example, a definition of the complete routing path from client 28 to server 32. The routing path may be specified, for example, as a list of POP nodes that should be traversed by the traffic from client 28 to server 32. Alternatively, any other suitable information, which is self-contained in specifying how to route packets from client 28 to server 32, can be embedded as routing information in the service IP address.

Additionally or alternatively, processor 44 may embed any other suitable type of state information, in the service IP address. Typically, processor 44 embeds the state information in spare bits of the service IP address. At a DNS response sending step 92, processor 44 sends to client 28 a DNS response that specifies the service IP address to the client.

At an overlay communication step 96, client 28 consumes the requested service by communicating with the appropriate server 32 over overlay system 20. As noted above, packets sent from client 28 to server 32 comprise the client IP address (assigned using the method of FIG. 2) as the source IP address, and the service IP address (assigned at steps 80-92 of FIG. 3) as the destination IP address. Similarly, packets sent from server 32 to client comprise the client IP address (assigned using the method of FIG. 2) as the destination IP address, and the service IP address (assigned at steps 80-92 of FIG. 3) as the source IP address.

Based on the state information embedded in the client IP address and/or the service IP address, processors 44 of POP nodes 24 process the traffic between the client and the server in a fully stateless manner. For example, processors 44 may route the traffic between the client and the server in a stateless manner, because every packet carries the complete routing information embedded in the service IP address. As another example, processors 44 may apply security and/or QoS policies (specified for the client and/or for the service), in a stateless manner, because every packet carries the policy definitions embedded in the client IP address and/or service IP address.

Typically, client 28 is unaware of the fact that the client IP address and/or service IP address comprise embedded state information. Client 28 establishes the connection with the requested service, and subsequently communicates with the server, using conventional mechanisms and software.

When using the disclosed techniques, server 32 communicates with a client IP address having the exact identity of the client (OPID) embedded therein. This identity-based communication enables system 20 to log and audit the connections.

System 20 is entirely stateless with regard to the data plane. There is no need to communicate with any external entity or service for performing data-plane decisions (e.g., enforcing routing, QoS and/or access control policies). All such decisions are carried out locally at the POP node level. In addition, if a POP node fails, the client will try to reconnect on its own initiative. The client will be connected to another, functional POP node, and continue operation. For this process, too, no state synchronization of any kind is required. As a result, system 20 is highly scalable.

In some practical scenarios, it is necessary to modify the state information embedded in an IP address, after the IP address has been assigned. Modification of embedded state information may be needed, for example, following failure in the network (e.g., of a POP interface or network link) that calls for a change in routing policy, following an update of a policy, or for any other reason. In an example embodiment, processors 44 embed information regarding network failures in the IPv6 addresses, as part of the embedded state information. In an embodiment, following an update in a policy pertaining to a certain client, processors 44 disconnect the client, causing the client to re-connect on its own initiative. Upon re-connection, processors 44 assign the client a different IP address whose embedded state information reflects the updated policy. Such policy updates are typically assumed to be rare.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
    multiple Point-of-Presence (POP) interfaces, which are distributed in a Wide-Area Network (WAN) and are configured to communicate with at least a client and a server connected to the WAN; and
    one or more processors, which are coupled to the POP interfaces and are configured to:
        assign respective Internet Protocol (IP) addresses to the client and to the server, wherein assigning the respective IP addresses to the client and to the server comprises embedding, in the IP addresses, state information comprising embedded routing information that includes a definition of a complete routing path between the client and the server for routing network traffic between the client and the server, wherein the complete routing path comprises a partial or a complete list of POP interfaces to traverse between the client and the server; and
        route the network traffic over the WAN between the client and the server, in a stateless manner, based on the state information embedded in the IP addresses, wherein routing the network traffic over the WAN between the client and the server comprises:
            receiving, from the server, one or more packets comprising the complete routing path between the client and the server, and
            routing the one or more packets based on the complete routing path between the client and the server, wherein the one or more packets are routed to the client without removing the state information embedded in the IP addresses.

2. The system according to claim 1, wherein the one or more processors are configured to route the network traffic based only on the embedded routing information that includes the definition of the complete routing path between the client and the server included in the one or more packets.

3. The system according to claim 1, wherein embedding the state information in the IP addresses comprises embedding, in the IP addresses, additional state information comprising a definition of a policy related to the server or the client.

4. The system according to claim 3, wherein the one or more processors are configured to enforce the policy, in a stateless manner, based on the definition of the policy included in the additional state information embedded in the IP addresses.

5. The system according to claim 1, wherein the one or more processors are configured to embed at least part of the state information upon initially provisioning the client.

6. The system according to claim 1, wherein the one or more processors are configured to embed at least part of the state information in response to receiving a request from the client to communicate with the server.

7. The system according to claim 6, wherein the one or more processors are configured to receive the request in a Domain Name System (DNS) request, and to respond to the DNS request by:
    assigning to the server an IP address having the at least part of the state information embedded therein, and
    sending to the client a DNS response comprising the IP address assigned to the server.

8. The system according to claim 1, wherein the one or more processors are configured to embed a unique identifier of the client in an IP address assigned to the client.

9. The system according to claim 1, wherein the IP addresses assigned to the client and to the server comprise IP version 6 (IPv6) addresses.

10. The system according to claim 1,
    wherein routing the network traffic over the WAN between the client and the server comprises routing the network traffic via at least a first POP interface of the multiple POP interfaces, and
    wherein the one or more processors are configured to route the network traffic via at least a second POP interface of the multiple POP interfaces upon a failure of the at least the first POP interface of the multiple POP interfaces, without synchronization between the second POP interface and the first POP interface.

11. A method, comprising:
    assigning respective Internet Protocol (IP) addresses to a client and to a server that are connected to a Wide-Area Network (WAN), wherein assigning the respective IP addresses to the client and to the server comprises embedding, in the IP addresses, state information comprising embedded routing information that includes a definition of a complete routing path between the client and the server for routing network traffic between the client and the server, wherein the complete routing path comprises a partial or a complete list of POP interfaces to traverse between the client and the server; and routing the network traffic over the WAN between the client and the server, in a stateless manner, using multiple Point-of-Presence (POP) interfaces distributed in the WAN, based on the state information embedded in the IP addresses, wherein routing the network traffic over the WAN between the client and the server comprises:

receiving, from the server, one or more packets comprising the complete routing path between the client and the server, and routing the one or more packets based on the complete routing path between the client and the server, wherein the one or more packets are routed to the client without removing the state information embedded in the IP addresses.

12. The method according to claim 11, wherein routing the network traffic comprises routing the network traffic based only on the embedded routing information that includes the definition of the complete routing path between the client and the server included in the one or more packets.

13. The method according to claim 11, wherein embedding the state information in the IP addresses comprises embedding, in the IP addresses, additional state information comprising a definition of a policy related to the server or the client.

14. The method according to claim 13, comprising enforcing the policy, in a stateless manner, based on the definition of the policy included in the additional state information embedded in the IP addresses.

15. The method according to claim 11, wherein embedding the state information comprises embedding at least part of the state information upon initially provisioning the client.

16. The method according to claim 11, wherein embedding the state information comprises embedding at least part of the state information in response to receiving a request from the client to communicate with the server.

17. The method according to claim 16, comprising receiving the request in a Domain Name System (DNS) request, wherein assigning the respective IP addresses to the client and to the server comprises responding to the DNS request by:

assigning to the server an IP address having the at least part of the state information embedded therein, and sending to the client a DNS response comprising the IP address assigned to the server.

18. The method according to claim 11, comprising embedding a unique identifier of the client in an IP address assigned to the client.

19. The method according to claim 11, wherein the IP addresses assigned to the client and to the server comprise IP version 6 (IPv6) addresses.

20. The method according to claim 11,
wherein routing the network traffic over the WAN between the client and the server comprises routing the network traffic via at least a first POP interface of the multiple POP interfaces, and wherein the method comprises routing the network traffic via at least a second POP interface of the multiple POP interfaces upon a failure of the at least the first POP interface of the multiple POP interfaces, without synchronization between the second POP interface and the first POP interface.

21. One or more non-transitory computer-readable media storing instructions that, when executed by one or more processors that are coupled to multiple Point-of-Presence (POP) interfaces that are distributed in a Wide-Area Network (WAN), cause the one or more processors to:

assign respective Internet Protocol (IP) addresses to a client and to a server connected to the WAN, wherein assigning the respective IP addresses to the client and to the server comprises embedding, in the IP addresses, state information comprising embedded routing information that includes a definition of a complete routing path between the client and the server for routing network traffic between the client and the server, wherein the complete routing path comprises a partial or a complete list of POP interfaces to traverse between the client and the server; and route the network traffic over the WAN between the client and the server, in a stateless manner, based on the state information embedded in the IP addresses, wherein routing the network traffic over the WAN between the client and the server comprises:

receiving, from the server, one or more packets comprising the complete routing path between the client and the server, and routing the one or more packets based on the complete routing path between the client and the server, wherein the one or more packets are routed to the client without removing the state information embedded in the IP addresses.

* * * * *